US006340947B1

(12) United States Patent
Chang et al.

(10) Patent No.: US 6,340,947 B1
(45) Date of Patent: Jan. 22, 2002

(54) METHOD AND SYSTEM FOR DETERMINING A POSITION OF A TRANSCEIVER UNIT UTILIZING TWO-WAY RANGING IN A POLYSTATIC SATELLITE CONFIGURATION INCLUDING A GROUND RADAR

(75) Inventors: Donald C. D. Chang, Thousand Oaks; Kar W. Yung, Torrance; John I. Novak, III, West Hills; William Goliff, Signal Hill, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/746,997

(22) Filed: Dec. 22, 2000

Related U.S. Application Data

(63) Continuation of application No. 08/803,935, filed on Feb. 21, 1997, now abandoned.
(51) Int. Cl.[7] .............................. G01S 5/04; G01S 1/24
(52) U.S. Cl. ................................... 342/357.01; 342/387
(58) Field of Search ........................... 342/357.01, 126, 342/453, 36, 37, 353, 387

(56) References Cited

U.S. PATENT DOCUMENTS 2,470,787 A    5/1949  Nosker
2,763,857 A  * 9/1956  Valley, Jr. ................... 342/125

(List continued on next page.)

FOREIGN PATENT DOCUMENTS

EP     0 335 558      4/1989
GB     2 271 902 A   10/1993

(List continued on next page.)

OTHER PUBLICATIONS

K.–H. Bethke, B. Rode, M. Schneider & A. Schroth, "A Novel Noncooperative Near–Range Radar Network for Traffic Guidance and Control on Airport Surfaces" IEEE Transactions on Control Systems Technology, vol. 1, No. 3, Sep. 1993.

(List continued on next page.)

Primary Examiner—Gregory C. Issing
(74) Attorney, Agent, or Firm—V. D. Duraiswamy; M. W. Sales

(57) ABSTRACT

A method and system for determining the position of an object, such as an aircraft, utilizes two-way ranging with a polystatic satellite configuration and ground radar. A ground transceiver at a first known location provides a bidirectional communication path between the ground transceiver and the object wherein the ground transceiver transmits a first ranging signal to the object and the object transmits a second ranging signal to the ground transceiver in response to the first ranging signal. A first communication transceiver at a second known location provides a first unidirectional communication path between the first communication transceiver and the object wherein the first communication transceiver performs one of transmitting a third ranging signal to the object and receiving a third ranging signal from the object in response to the first ranging signal. A second communication transceiver at a third known location for providing a second unidirectional communication path between the second communication transceiver and the object wherein the second communication transceiver performs one of transmitting a fourth ranging signal to the object and receiving a fourth ranging signal from the object in response to the first ranging signal. A signal processor determines a first, second and third path length, and determines the position of the object based on the first, second and third known locations and the first, second and third path lengths.

10 Claims, 4 Drawing Sheets

U.S. PATENT DOCUMENTS

| | | | | |
|---|---|---|---|---|
| 2,821,704 | A | * | 1/1958 | O'Day .................... 342/126 |
| 3,384,891 | A | | 5/1968 | Anderson ................ 343/6.5 |
| 3,544,995 | A | | 12/1970 | Bottenberg et al. ........... 343/6 |
| 3,665,464 | A | * | 5/1972 | Meilander ................ 342/36 |
| 3,668,403 | A | * | 6/1972 | Meilander ................ 342/36 |
| 4,161,730 | A | | 7/1979 | Anderson ................ 343/6.5 |
| 4,161,734 | A | | 7/1979 | Anderson ................ 345/100 |
| 4,359,733 | A | | 11/1982 | O'Neill .................... 343/6.5 |
| 4,613,864 | A | | 9/1986 | Hofgen ................... 343/357 |
| 4,897,661 | A | | 1/1990 | Hiraiwa .................. 342/457 |
| 4,994,809 | A | | 2/1991 | Yung et al. .............. 342/108 |
| 5,006,855 | A | | 4/1991 | Braff ..................... 342/357 |
| 5,099,245 | A | | 3/1992 | Sagey .................... 342/357 |
| 5,111,209 | A | | 5/1992 | Toriyama ................ 342/357 |
| 5,126,748 | A | | 6/1992 | Ames et al. .............. 342/353 |
| 5,387,916 | A | | 2/1995 | Cohn ...................... 342/44 |
| 5,410,314 | A | | 4/1995 | Frush et al. ............... 342/26 |
| 5,444,450 | A | | 8/1995 | Olds et al. ............... 342/357 |
| 5,525,995 | A | | 6/1996 | Benner .................... 342/90 |
| 5,739,785 | A | | 4/1998 | Allison et al. ............ 342/357 |
| 5,944,770 | A | | 8/1999 | Enge et al. .............. 701/207 |
| 5,945,948 | A | | 8/1999 | Buford et al. ............ 342/457 |
| 5,969,674 | A | | 10/1999 | Von der Embse et al. .. 342/357 |

FOREIGN PATENT DOCUMENTS

| | | |
|---|---|---|
| GB | 2 306 827 A | 5/1997 |
| JP | 2-28580 | 1/1990 |
| JP | 3-291584 | 12/1991 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |

OTHER PUBLICATIONS

Doc 9524, FANS/4–WP/76, International Civil Aviation Organization, Special Committee on Future Air Navigation Systems, Fourth Meeting, Montreal, May 2–20, 1988, pp. 3.2B–2 & 3.2B–3.

Teles J et al: "Overview of TDRSS" Orbit Determination and Analysis. PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker,P. et al. "Integrated Receiver for NASA Tracking and Data Relay Satellite System", MILCOM 90. A New Era. 1990 IEEE Military Communications Conference, Monterey CA, USA, Sep. 30–Oct. 3, 1990, pp. 1–5.

Dunham, J. B., et al.: "Onboard Orbit Estimation with Tracking and Data Relay Satellite System Data", Journal of Guidance, Control, and Dynamics, Jul.–Aug. 1983, USA, vol. 6, NR. 4, pp. 292–301.

* cited by examiner

METHOD AND SYSTEM FOR DETERMINING A POSITION OF A TRANSCEIVER UNIT UTILIZING TWO-WAY RANGING IN A POLYSTATIC SATELLITE CONFIGURATION INCLUDING A GROUND RADAR

This application is a continuation of application Ser. No. 08/803,935 filed Feb. 21, 1997 now abandoned.

CROSS-REFERENCE TO RELATED APPLICATIONS

This application is related to co-pending application Ser. No. 08/803,936 entitled "Method and System for Determining a Position of a Target Vehicle Utilizing Two-Way Ranging," filed Feb. 21, 1997 issued as U.S. Pat. No. 5,969,674 on Oct. 19, 1999 and is further related to co-pending application Ser. No. 08/803,937 entitled "Method And System for Determining A Position Of A Transceiver Unit Utilizing Two-Way Ranging in a Polystatic Satellite Configuration," filed Feb. 21, 1997.

TECHNICAL FIELD

This invention relates to methods and systems for determining a position of a transceiver unit, such as employed on an aircraft, utilizing two-way ranging in a polystatic satellite configuration including a ground radar.

BACKGROUND ART

Current Automatic Dependent Surveillance (ADS) technology, such as Global Positioning System (GPS), Wide Area Augmentation System (WAAS) or GLONASS, provides positioning information utilizing satellite transmissions. For example, the GPS, developed and deployed by the U.S. Department of Defense, consists of 24 satellites orbiting the earth twice a day at an altitude of 12,000 miles, as well as five ground stations to monitor and manage the satellite constellation. Using atomic clocks and location data, GPS satellites transmit continuous time more satellites at once to determine the user's position. By measuring the time interval between the transmission and the reception of a satellite signal, the GPS receiver calculates the distance between the user and each satellite, and then uses the distance measurements of at least three satellites to arrive at a position.

Such systems, however, utilize one-way ranging in which an accurate, synchronized clock is required at each station. Any synchronization error or error regarding the location of one of the satellites results in an error in the determined position of the target vehicle. Thus, there is a need to provide very accurate position and velocity information with a high degree of integrity and reliability.

DISCLOSURE OF THE INVENTION

It is thus a general object of the present invention to provide a method and system for determining a location of an object with a high degree of integrity and reliability utilizing two-way ranging in a polystatic satellite configuration to derive independent estimates of the transceiver's state vectors including position and velocity.

In carrying out the above object and other objects, features, and advantages of the present invention, a method is provided for determining position of an object. The method includes the steps of transmitting a first ranging signal from a first known ground location to the object and transmitting a second ranging signal in response to the first ranging signal to the first known ground location. The method also includes the steps of transmitting a third ranging signal in response to the first ranging signal to a second known location and transmitting a fourth ranging signal in response to the third ranging signal to a third known location. The method further includes the step of determining a first delay corresponding to a time difference between transmission of the first ranging signal and receipt of the second ranging signal. The method also includes the step of determining a second delay corresponding to a time difference between transmission of the first ranging signal and receipt of the third ranging signal. Still further, the method includes the step of determining a third delay corresponding to a time difference between transmission of the first ranging signal and receipt of the fourth ranging signal. The method finally includes the step of determining the position of the object based on the first, second, and third known locations and the first, second and third delays.

In further carrying out the above object and other objects, features, and advantages of the present invention, a system is also provided for carrying out the steps of the above described method. The system includes a ground transceiver at a first known ground location for providing a bidirectional communication path between the ground transceiver and the object wherein the ground transceiver transmits a first ranging signal to the object and the object transmits a second ranging signal to the ground transceiver in response to the first ranging signal. The system also includes a first communication transceiver at a second known location for providing a first unidirectional communication path between the first communication transceiver and the object wherein the first communication transceiver performs one of transmitting a third ranging signal to the object and receiving a third ranging signal from the object in response to the first ranging signal. The system further includes a second communication transceiver at a third known location for providing a second unidirectional communication path between the second communication transceiver and the object wherein the second communication transceiver performs one of transmitting a fourth ranging signal to the object and receiving a fourth ranging signal from the object in response to the first ranging signal. Finally, the system includes a signal processor for determining a first path length corresponding to a first time length of the bidirectional communication path, determining a second path length corresponding to a second time length of the first unidirectional communication path, determining a third path length corresponding to a third time length of the second unidirectional communication path, and determining the position of the object based on the first, second, and third known locations and the first, second, and third path lengths.

The above object and other object, features and advantages of the present invention are readily apparent from the following detailed description of the best mode for carrying out the invention when taken in connection with the accompanying drawings.

BEST MODES FOR CARRYING OUT THE INVENTION

Figure 1:
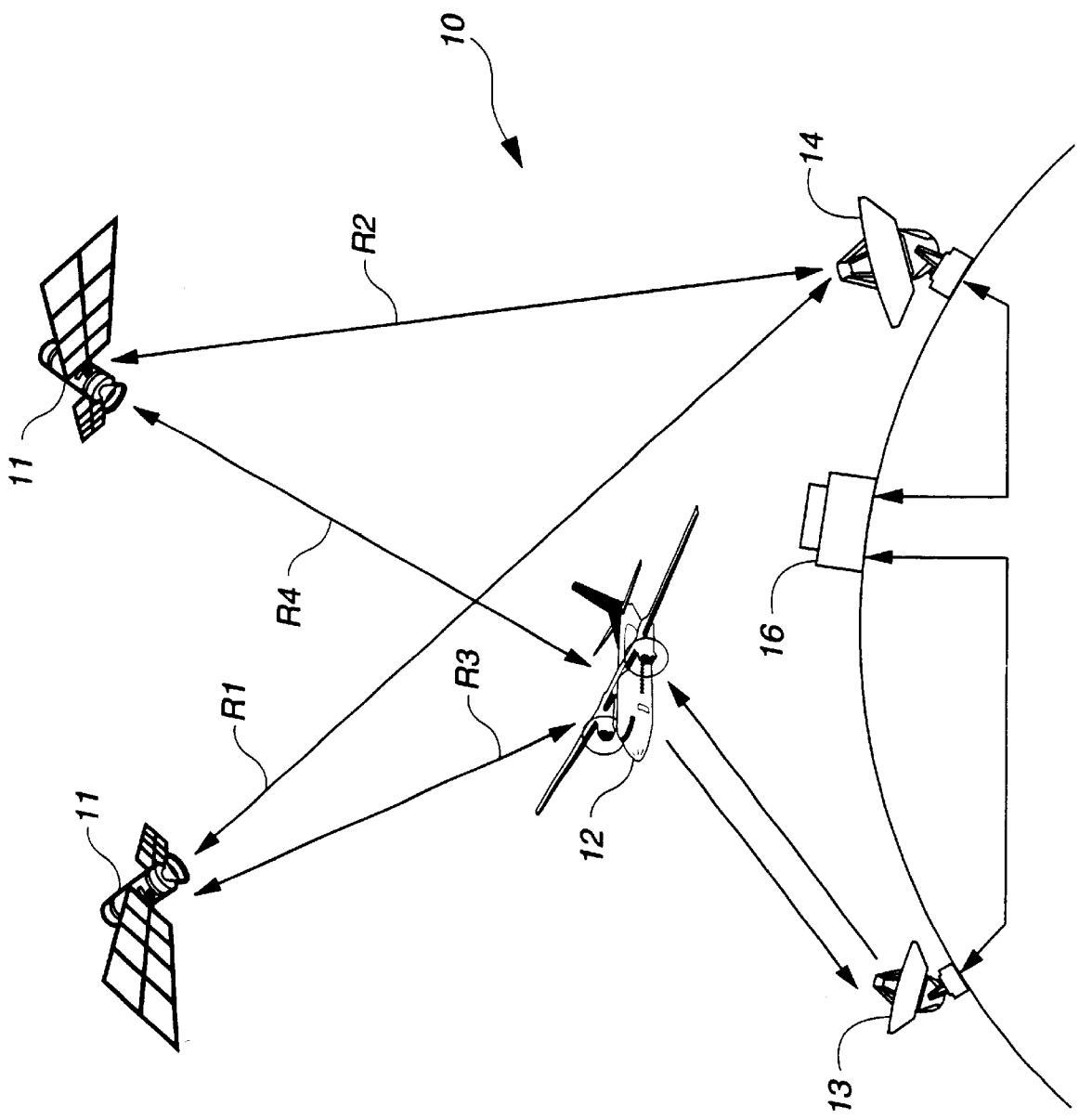
FIG. 1 is a diagrammatic representation illustrating a communication system employing the method and apparatus of the present invention.

Referring first to FIG. 1, a communication system 10 with a typical geometry for practicing the present invention is diagrammatically illustrated. The present invention is particularly suited for determining the position of an aircraft during Category I landings, as described with reference to the preferred embodiment. However, the present invention is also suitable for tracking other objects, such as a surface ground vehicle. There are typically two communication satellites 11 within the field of view of an aircraft 12 when aircraft 12 is in a final landing phase. Aircraft 12 communicates with at least one traffic controller station 16 via a ground radar 13 and/or a satellite ground station 14. Communication satellites 11 are preferably in multiple planes using Low Earth Orbit (LEO) satellite constellations and/or Medium Earth Orbit (MEO) satellite constellations such as Iridium, Intermediate Circular Orbit (ICO), Teladesic and Globalstar. In addition, a Geosynchronous Earth Orbit (GEO) satellite constellation may also be used in conjunction with the LEO and/or MEO satellite constellations. The planned ICO configuration with ten to twelve satellites in two planes is adequate to implement the position location and tracking of aircraft 12.

The stationary ground radar 13, such as a Secondary Surveillance Radar (SSR), provides better accuracy in determining the position of the aircraft 12 since it is at a fixed known location on ground. Stationary radar 13 interrogates a transceiver (not shown) on board aircraft 12 with a pulsed ranging signal. Aircraft 12 then responds by transmitting a return pulsed ranging signal with a time stamp back to stationary ground radar 13, thus utilizing two-way ranging.

To obtain more accuracy and flexibility, the present invention employs a polystatic configuration. A polystatic configuration consists of several transceivers at separated locations, which cooperate with each other. The transceivers may be stationary or moving. In a monostatic configuration, the forward and return ranging signals propagate through the same link. As such, the equal range locations of the measurement are confined to a spherical surface centered on the relay satellite position with a radius (range) equal to a distance between aircraft 12 and the relay satellite. By utilizing polystatic techniques, in which the forward and return ranging signals propagate through different satellites, the equal range locations of the measurement are confined to an ellipsoidal surface. The two foci are located at the satellite positions so that the sum of the distances between aircraft 12 and the two satellites 11 is a constant.

Thus, the interrogating signal initiated by stationary ground radar 13 also triggers aircraft 12 to regenerate additional ranging signals with respective time stamps for receipt by each of the communication satellites 11. Communication satellites 11 then forward the ranging signals to ground via satellite ground station 14, such as a Satellite Access Node (SAN).

Similarly, various ranging signals from satellite ground station 14 to aircraft 12 via communication satellites 11 trigger different responding signals from aircraft 12. The responding signals are forwarded back to ground in one of two ways: 1) only back to stationary ground radar 13 directly or 2) back to stationary ground radar 13 and each of the communication satellites 11. Preferably, traffic controller station 16 informs the aircraft 12 of which return link strategy to employ prior to initiation of the two-way ranging.

Traffic controller station 16 compares the received time stamps to the time at which the ranging signals were initiated on ground. Preferably, traffic controller station 16 is an Air Traffic Controller (ATC) facility having signal processing capability. Alternatively, the signal processing capability may be located at stationary ground radar 13 and/or satellite ground station 14. The lengths of the various paths are determined by calculating the difference between the received time stamps and the initiated time stamps of each of the ranging signals. Traffic controller station 16 then determines the location of aircraft 12 utilizing a triangulation calculation based on the lengths of the various paths, the position of stationary ground radar 13 and the ephemeris of communication satellites 11. ATC facility 16 will also relay the ground-validated position and velocity vectors to aircraft 12 for use by the pilot of aircraft 12.

The present invention may be utilized in conjunction with GPS. When GPS signals are available, the GPS signals are used to derive the aircraft state vector which is then transmitted to traffic controller station 16, via communication satellites 11 and satellite ground station 14. Improved estimation of the aircraft state vectors is accomplished through data fusion of the two independent measurements, i.e., the GPS measurement and the two-way ranging measurement. The updated aircraft state vectors are then transmitted to aircraft 12. The time stamps through various forward links arrive at aircraft 12 in different time slots. It is possible to allow fixed processing delays to multiplex the time stamps together, and then transmit the multiplexed ranging signal through different return links simultaneously or sequentially. However, it is also possible to transmit the multiplexed signal through a single return link to save return link space assets when needed. Similarly, the present invention is flexible enough to save forward link assets also. In addition, it is possible to use ICO satellites either as forward or as return link relays (not both) and to utilize other (GEO, MEO or LEO) mobile satellites as the complementary link relays.

The positions in space of communication satellites 11 are known so that the ranges $R_1$ and $R_2$ between each of communication satellites 11 and satellite ground station 14 are known. However, ranges $R_1$ and $R_2$ can be calibrated over time to obtain a more accurate measurement. The links $R_3$ and $R_4$ are then employed to determine the state vectors by two-way ranging from satellite ground station 14 to aircraft 12. The time difference between the time at which the ranging signal is transmitted by satellite ground station 14 and the time at which the responding ranging signal from aircraft 12 is received by satellite ground station 14 is used in determining ranges $R_3$ and $R_4$.

Figure 2:
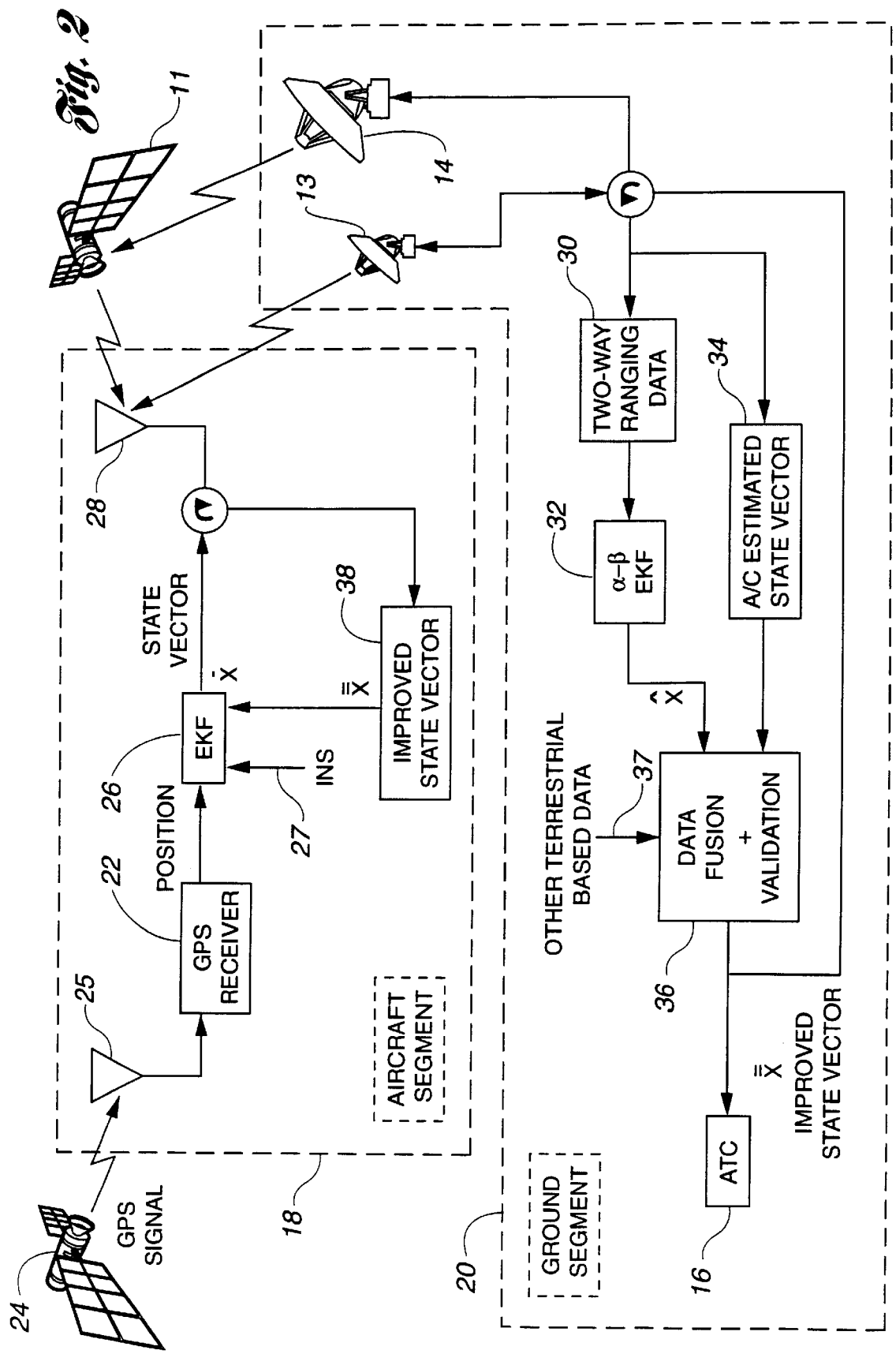
FIG. 2 is a block diagram of the aircraft segment and the ground segment included in the system shown in FIG. 1.

Turning now to FIG. 2 there is shown simplified block diagrams of both an aircraft segment 18 and a ground segment 20 of the present invention. Aircraft segment 18 includes a conventional GPS receiver 22 for receiving GPS signals from a GPS satellite 24 via an antenna 25. GPS receiver 22 sends a position signal to a conventional Extended Kalman-Filter (EKF) 26 which tracks a position signal as a state vector. An optional input 27 to EKF 26 is a signal from an Inertial Navigation System (INS), such as a conventional mechanical gyro system which monitors the distance traveled by aircraft 12 from a predetermined position.

Aircraft 12 receives ranging signals from communication satellites 11 and stationary ground radar 13 via a second antenna 28. Second antenna 28 is preferably a retrodirective antenna implemented with a Butler matrix, a low-profile digital beam former, and Wavelet-based Finite-Impulse-Response (WFIR) signal processing. The retrodirective antenna measures the direction of the received signal from communication satellite 11 and stationary ground radar 13 and automatically transmits the return signal back accordingly. The Butler matrix implements a Fourier transform forming a set of nearly orthogonal beams covering the field-of-view and is a relatively inexpensive approach to realizing a retrodirective antenna. The low-profile digital beam former array lends itself to a thin conformal array configuration which is preferred for aircraft installation. Optionally, a tracking antenna can be used in place of a retrodirective antenna which consists of either an electronically or mechanically steered antenna driven by a monopulse, step-scanned, or conically-scanned tracking loop.

In order to utilize polystatic techniques in the present invention, a digital implementation of the Butler matrix is also required, such as a conjugate gradient digital beam former, in order to memorize the phase gradients of signals from various communication satellites 11, i.e, the direction of the incoming signals, and to apply proper phase conjugations to the outgoing signals so that the outgoing signals are directed to appropriate communication satellites 11.

Figure 3:
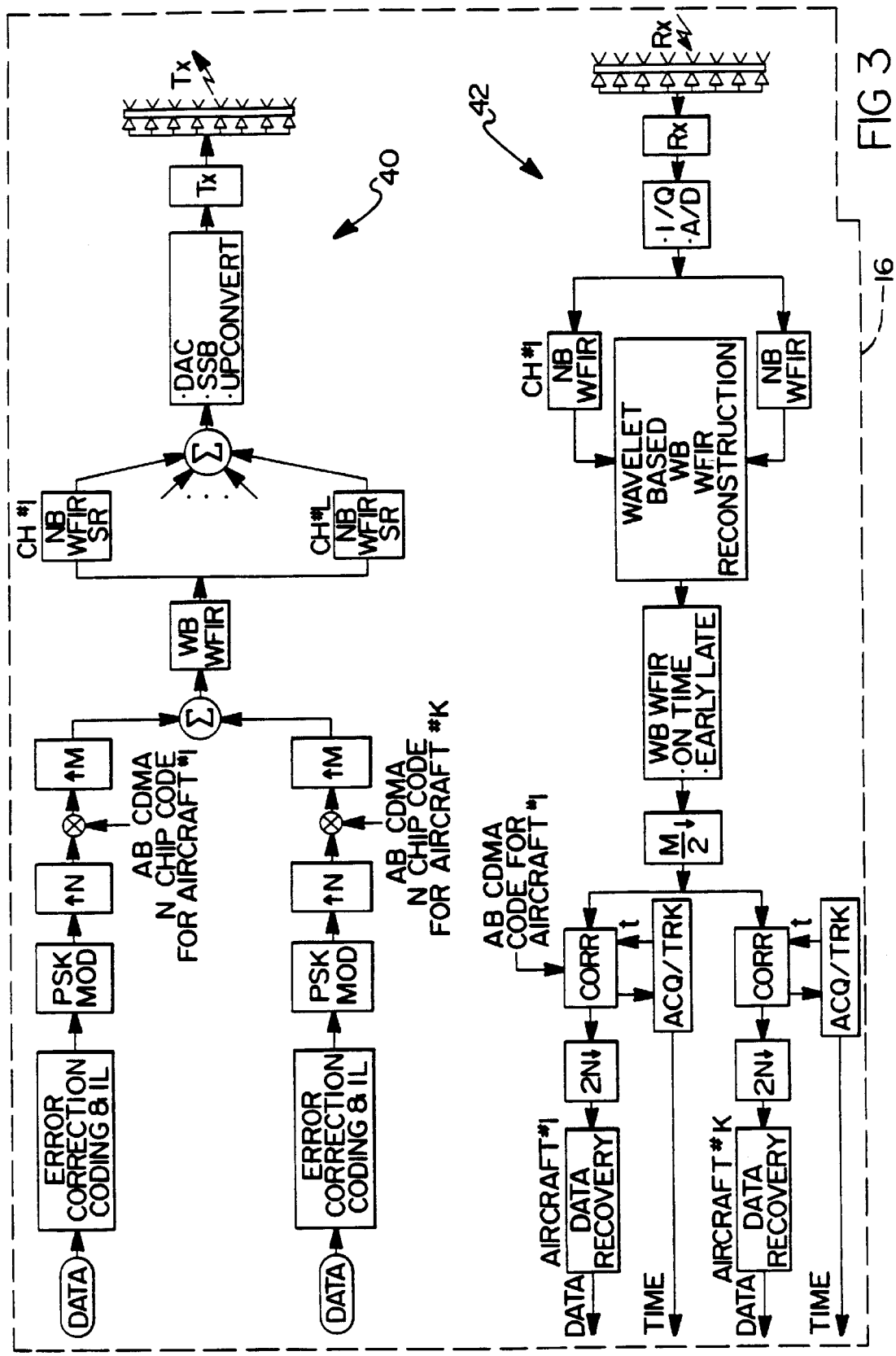
FIG. 3 is a block diagram of a preferred transmitter and a preferred receiver for the traffic controller station used in the system of FIG. 1.

The data between aircraft segment 18 and ground segment 20 can be combined with the unique ranging code signal in one of several ways: 1) Overlaying a Auslander-Barbano (AB) Code Division Multiple access (CDMA) tracking code on the communication link channels as low-level Additive White Gaussian Noise (AWGN), thermal noise-like signals which slightly raise the thermal noise floor; 2) Modulating the communication data with the AB CDMA ranging code and sent as a single waveform, as shown in FIG. 3; and 3) Separating the ranging links from data links. In the preferred embodiment shown in FIG. 3, ATC facility 16 transmits data which is modulated by a WFIR waveform with a unique AB ranging code assigned to each aircraft being tracked in the particular time slot. WFIR modulation enables the ranging signals to have variable resolution in addition to variable length. The waveform specifically provides a means to transmit a relatively wide-band WFIR ranging waveform over a group of narrow-band communication satellite channels, simultaneously or sequentially, and supports simultaneous ranging/doppler measurements and data demodulation.

The two-way ranging data 30 is sent to ground segment 20 via stationary ground radar 13 and satellite ground station 14. Two-way ranging data 30 is used to drive a dual alpha-beta ($\alpha$-$\beta$)/EKF tracking loop 32 wherein the fast $\alpha$-$\beta$ loop tracks the AB CDMA code in communication coordinates, and the slow EKF tracks the target aircraft in Earth Centered Inertial (ECI) coordinates to provide a unique preferred tracking architecture with low-complexity, high accuracy, and high integrity with fast-response valid-track metrics, and the ability to track out total-electron-content (TEC) induced waveform transmission range and doppler offsets.

The $\alpha$-$\beta$ loop is a relatively fast pair of time and frequency tracking loops which measure and smooth the received two-way ranging signals during each access. The four dimensional state vector Z for the $\alpha$-$\beta$ loop consists of the timing offset, time drift, frequency offset and frequency drift. Time drift refers to clock drift whereas frequency offset refers to doppler shift due to link motion plus TEC. The state vector X for the EKF loop has eleven components consisting of the three-dimensional ECI position coordinates, velocity, acceleration, and the ranging plus doppler coordinates associated with ionospherical TEC effects.

Based on the $\alpha$-$\beta$ observation data from a previous access, the EFK loop predicts ahead its state $X_k$ at the state transition time k*T, where T is the update interval for the EKF. This state is mapped into the corresponding predicted state $Z_k$ of the $\alpha$-$\beta$ loop. During the access slot time $\Delta T$, the $\alpha$-$\beta$ loop generates a smoothed state $Z_k$ which is then used by the EKF to smooth the predicted state to generate the smoothed state $X_k$. This allows the EKF to predict ahead the state $X_{k+1}$ at (k+1)*T. This procedure is repeated for the next access.

The predicted state vector from the dual $\alpha$-$\beta$/EKF tracking loop 32 and the estimated state vector 34 from aircraft 12 are transmitted to a fusion processor 36 which performs data fusion and validation between the two independent measurements to obtain an improved state vector estimation. Fusion processor 36 also receives other terrestrial based data 37, such as position of stationary ground radar 13, position of satellite ground station 14, and position of communication satellites 11. The improved state vector estimation is forwarded to ATC facility 16 which then transmits this information to aircraft 12. The improved state vector estimation 38 received by aircraft 12 is processed by EKF 26 to generate a new state vector.

Referring now to FIG. 3, additional details of the receiver and transmitter used in traffic controller station 16 are shown comprising a transmitter 40 and a receiver 42. Satellite ground station 14 transmits data which is modulated by a wavelet-based finite impulse response (WFIR) waveform with a unique AB ranging code assigned to each aircraft 12 being tracked in the access time slot. The TDMA data to the targeted aircraft is modulated by the N-chip AB code sequence, unsampled by the WFIR sample rate M, and added with signals to other aircraft sharing the same access slot. The summed output is filtered by a wideband WFIR filter with overlaid envelope of the AB ranging waveforms. A bank of narrowband WFIR filters channelizes the wideband waveform into a set of narrowband waveforms which are compatible with the satellite communication channels such as ICO.

The receive processing at satellite ground station 14 is shown at 42. The baseband signal from the digitizer, shown as an analog-to-digital (A/D) function and an in-phase-quadrature (I/Q) function which may be combined is detected by a bank of narrowband (NB) WFIR filters matched to the ICO communication channels. The outputs are used to perform reconstruction of the wideband WFIR ranging signal for each aircraft. This reconstructed wideband WFIR waveform is then detected by on-time, early, and late correlators. The ranging time and data from each aircraft is recovered by separate processing which performs the AB CDA despreading, acquisition, tracking, time recovery, and data recovery.

Figure 4:
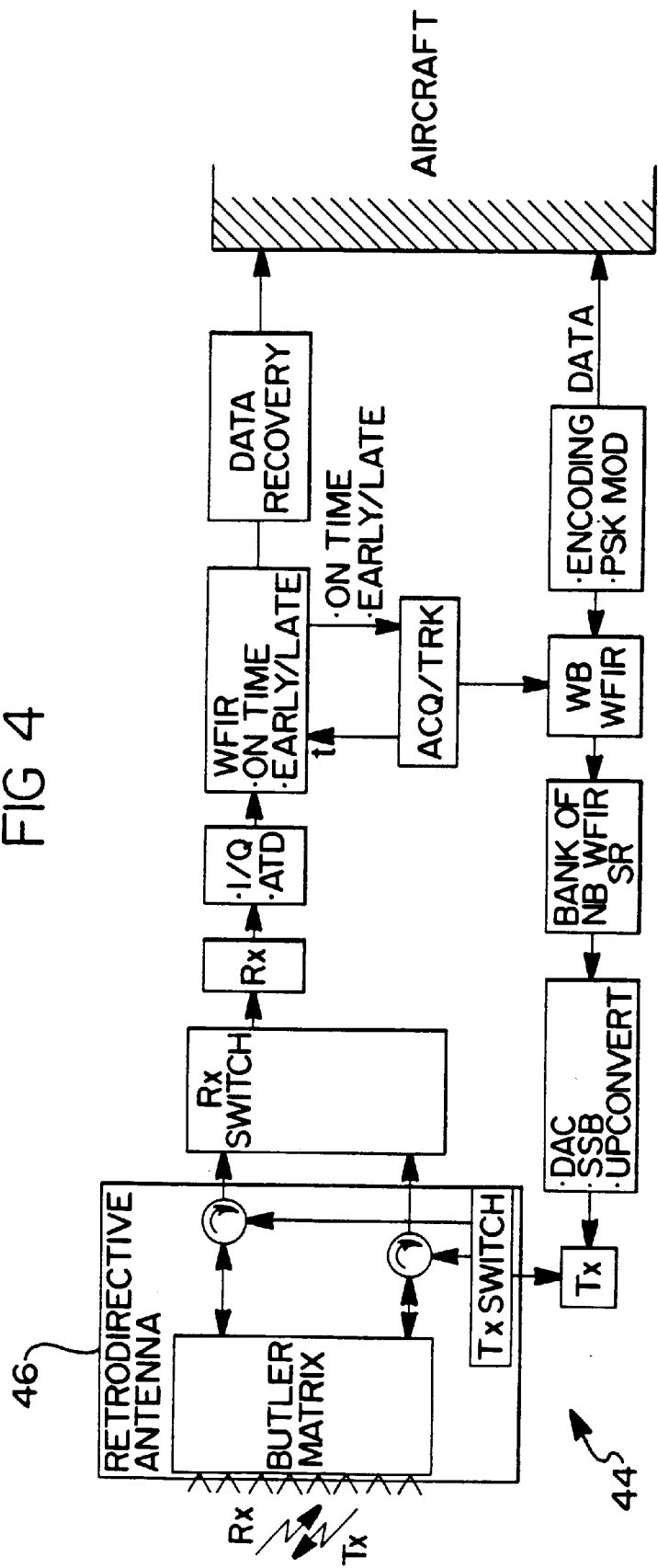
FIG. 4 is a block diagram of a preferred transmitter and a preferred receiver for a vehicle in the system of FIG. 1.

As best shown in FIG. 4, the aircraft receiver/transmitter 44 preferably includes a retrodirective antenna 46. A Butler matrix, low profile digital beam form (DBF), and WFIR signal processing are preferably employed. The retrodirective antenna 46 measures the direction of the received signal from the satellite 11, and automatically transmits the return signal back to the appropriate satellite 11. The Butler matrix implements a Fourier transform forming a set of nearly orthogonal beams covering the field of view, and has been proved to be a relatively inexpensive approach to realize a retrodirective antenna. The low profile DBF array lends itself to a thin conformal array configuration which is preferred for aircraft installation. The implementation technique eliminates the need for an expensive tracking antenna on the aircraft which usually consists of either an electronically or a mechanically steered antenna driven by a monopulse, step-scanned, or conically-scanned tracking loop.

The principles of the present invention are utilized by an aircraft in a final approach and landing phase. However, the method and system can be extended to air space having a high density of traffic and covered by existing S-band secondary surveillance radars. The present invention compliments ADS technique based on Global Navigation Satellite System (GNSS) using GPS and/or Glonass systems. However, this invention will function without ADS.

While the best modes for carrying out the invention have been described in detail, those familiar with the art to which this invention relates will recognize various alternative designs and embodiments for practicing the invention as defined by the following claims.

What is claimed is:

1. A method for determining position of an object using a ground radar and first and second satellites located in a field of view of the object, wherein the first and second satellites are separated from the object and the ground radar in a substantially vertical plane, the method comprising:

transmitting a first ranging signal from the ground radar directly to the object;

transmitting a second ranging signal from the object directly to the ground radar, in response to the object receiving the first ranging signal;

transmitting a third ranging signal from the object directly to the first satellite, in response to the object receiving the first ranging signal;

transmitting a fourth ranging signal from the first satellite directly to a satellite ground station, in response to the first satellite receiving the third ranging signal;

transmitting a fifth ranging signal from the object directly to the second satellite, in response to the object receiving the ranging signal;

transmitting a sixth ranging signal from the second satellite directly to the satellite ground station,, in response to the second satellite receiving the fifth ranging signal;

determining a first time delay corresponding to a time difference between transmission of the first ranging signal and receipt of the second ranging signal;

determining a second time delay to a time difference between transmission of the first ranging signal and receipt of the fourth ranging signal;

determining a third time delay corresponding to a time difference between transmission of the first ranging signal and receipt of the sixth ranging signal; and determining the position of the object based on known locations of the ground radar, the first satellite, the second satellite, and the satellite ground station, and the first, second, and third time delays.

2. The method of claim 1 wherein:

the first ranging signal includes a unique code assigned to the object, wherein transmitting the second, third, and fifth ranging signal from the object is performed in response to the object receiving a first ranging signal having the unique code assigned to the object.

3. The method of claim 1 wherein:

the first, second, third, fourth, fifth, and sixth ranging signals are AB CDMA ranging signals.

4. The method of claim 1 wherein:

the ground radar is a secondary surveillance ground radar.

5. The method of claim 1 wherein:

the object is an aircraft.

6. A system for determining position of an object, the system comprising:

a satellite ground station;

a ground radar for transmitting a first ranging signal directly to the object, and for receiving a second ranging signal transmitted from the object directly to the ground radar in response to the object receiving the first ranging signal;

a first satellite located in the field of view of the object for receiving a third ranging signal transmitted from the object directly to the first satellite in response to the object receiving the first ranging signal, and for transmitting a fourth ranging signal directly to the satellite ground state in response to receiving the third ranging signal from the object;

a second satellite located in the field of view of the object for receiving a fifth ranging signal transmitted from the object directly to the second satellite in response to the object receiving the first raging signal, and for transmitting a sixth ranging signal directly to the satellite ground station in response to receiving the fifth ranging signal from the object, wherein the first and second satellites are separated from the object and the ground radar in a substantially vertical plane; and a processor for determining a first time delay corresponding to a time difference between transmission of the first ranging signal and receipt of the second ranging signal, for determining a second time delay corresponding to a time difference between transmission of the first ranging signal and receipt of the fourth ranging signal, and for determining a third time delay corresponding to a time difference between transmission of the first ranging signal and receipt of the sixth ranging signal, wherein the processor determines the position of the object based on known locations of the ground radar, the first satellite, the second satellite, and the satellite ground station, and the first, second, and third time delays.

7. The system of claim 6 wherein:

the first ranging signal includes a unique code assigned to the object, wherein transmitting the second, third, and fifth ranging signal from the object is performed in response to the object receiving a first ranging signal having the unique code assigned to the object.

8. The system of claim 6 wherein:

the first, second, third, fourth, fifth, and sixth ranging signals are AB CDMA ranging signals.

9. The system of claim 6 wherein:

the ground radar is a secondary surveillance ground radar.

10. The system of claim 6 wherein:

the object is an aircraft.

* * * * *